3,320,135
METHOD OF PRODUCING L-GLUTAMIC ACID FROM HYDANTOINPROPIONIC ACID
Shinji Okumura, Tamio Ito, and Ryuichiro Tsugawa, Tokyo, Noboru Katsuya, Kanagawa-ken, and Masahiro Takahashi, Tokyo, Japan, assignors to Ajinomoto Co. Inc., Tokyo, Japan
No Drawing. Filed Oct. 11, 1966, Ser. No. 585,741
Claims priority, application Japan, May 25, 1963, 38/27,194
8 Claims. (Cl. 195—30)

This application is a continuation-in-part of our co-pending application Ser. No. 369,002, filed, on May 20, 1964, now abandoned.

This invention relates to the production of L-glutamic acid, and more particularly to the production of crystalline L-glutamic acid from hydantoinpropionic acid.

DL-hydantoinpropionic acid is available by synthesis. When DL-hydantoinpropionic acid is hydrolyzed by conventional chemical methods, racemic glutamic acid is obtained. The optically active forms of glutamic acid can be prepared by chemical hydrolysis only from the corresponding optically active forms of hydantoinpropionic acid. L-glutamic acid and its salts are valuable seasoning agents. There is no appreciable use at this time for D-glutamic acid or for DL-glutamic acids, except as intermediates in the production of L-glutamic acid.

The object of the invention is the provision of a method which permits DL-hydantoinpropionic acid and D-hydantoinpropionic acid to be converted directly to L-glutamic acid in a single-step hydrolysis reaction.

We have found that an enzyme of microbial origin is capable of converting L-hydantoinpropionic acid, D-hydantoinpropionic acid and DL-hydantoinpropionic acid into L-glutamic acid by biochemical hydrolysis in good yields according to the formulas

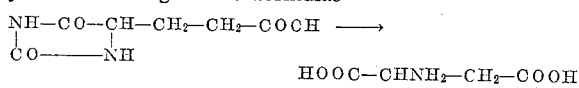

Microorganisms capable of converting hydantoinpropionic acid to L-glutamic acid are found in many families and genera. Suitable strains have been isolated from fungi, yeasts, actinomycetes and bacteria. The following test has been employed for screening the microorganisms:

Living cells corresponding to 0.1 to 1.0 g. dry matter are suspended in 100 ml. of an aqueous solution containing 0.5–1.0% hydantoinpropionic acid. The suspension is adjusted to a pH value between 6 and 11, and it is kept for 72 hours at a temperature between 30° and 37° C. The L-glutamic acid present in the liquid is then determined by bioassay using *Escherichia coli* Crooks. Conversion of hydantoinpropionic acid to L-glutamic acid at a rate of more than 2 mole percent indicates that the microorganisms employed are useful in the method of the invention.

Many suitable strains of microorganisms have been isolated from the genera Bacillus, Pseudomonas, Micrococcus, Aerobacter, Escherichia, and Achromobacter. The following strains are typical of those which are especially suitable for our invention:

*Bacellius brevis*, ATCC 8185 (1)
*Pseudomonas dacunhae*, IAM 1199 (1, 2)
*Pseudomonas incognita*, IPR.AHH 38 (1,3)
Pseudomonas sp. No. 42, ATCC 15447
*Micrococcus subflavus* Fuege, IFO 3062 (4)
*Aerobacter cloaceae* T–13 (1)
*Aerobacter aerogenes* T–14 (1)
*Escherichia intermedia*, IPR S–51
*Achromobacter pestifer* No. 80, ATCC 15445
*Achromobacter cycloclastes* N–1B–3, TCC 15446

Notes:
(1) Described in Bergey's Manual of Determinative Bacteriology, 7th edition.
(2) IAM—identification number of Institute of Applied Microbiology, Tokyo University, Japan.
(3) IPR—identification number of the Institute of Food Bacteriology, Chiba University, Japan.
(4) IFO—identification number of the Institute for Fermentation, Osaka, Japan.

Living cells of these organisms, suspensions of such cells in aqueous media, culture media on which the microorganisms were grown, ground cells, and crude cell extracts contain the enzyme which converts all forms of hydantoinpropionic acid to L-glutamic acid. The enzyme supplying material is contacted with an aqueous solution of hydantoinpropionic acid at a pH between 6 and 11.

The microorganisms which furnish the enzyme may be cultured by conventional methods under aerobic conditions on media which contain a source of assimilable carbon, a source of assimilable nitrogen, inorganic salts, and organic growth promoting agents. The pH of the medium should be between 4 and 9, and its temperature between 15° and 50° C. Enzyme formation is generally enhanced by the presence of a small amount of hydantoinpropionic acid in the culture medium. It is also possible to incorporate relatively large amounts of hydantoinpropionic acid in the nutrient medium so that the growth of the microorganisms and the hydrolysis of the hydantoinpropionic acid are achieved in a single step.

Hydantoinpropionic acid is converted by the enzyme to L-glutamic acid regardless of the form of the acid. The free acid, its alkali metal and alkaline earth metal salts (Na, K, Ca), its salts with organic bases, and even esters and amides are directly converted to L-glutamic acid unless they contain a component which inhibits enzyme action. The concentration of the hydantoinpropionic acid dissolved in the aqueous hydrolysis mixture is not critical.

While the hydrolysis of the hydantoinpropionic acid may be carried out at any pH between 6 and 11, an alkaline medium is preferred. The pH of the medium rises during hydrolysis, and acid may have to be added from time to time to maintain the desired pH value. Hydantoinpropionic acid itself may be employed as the acid for maintaining the hydrogen ion concentration. The hydrolysis may be performed at temperatures between 20° and 85°.

Glutamic acid may be recovered from the hydrolysis mixture by conventional methods.

The following examples further ilustrate the method of the invention but the invention is not limited thereto.

Example 1

A medium was prepared from—

| | G./dl. |
|---|---|
| Glucose | 0.5 |
| Yeast extract | 1.0 |
| Peptone | 1.0 |
| Sodium chloride | 0.3 |
| DL-hydantoinpropionic acid | 1.0 |

50 milliliters of the medium were inoculated with *Bacillus brevis*, ATCC 8185, and cultured 24 hours at 31° C. at pH 7.0.

The bacterial cells were separated from the broth by centrifuging, and suspended in an amount of physiological saline solution equal to one fourth of the original broth volume in order to wash the cells. The cells were separated from the washing liquid by centrifuging, and again suspended in an equal amount of isotonic saline solution.

Eighteen mixtures were prepared from 0.5 ml. of the cell suspension, 0.5 ml. of a 1 g./dl. solution of hydantoinpropionic acid, and 1.0 ml. of an M/8 phosphate buffer, and the mixtures were incubated at 31° C. In nine mixtures, L-hydantoinpropionic acid was employed, in the other nine D-hydantoinpropionic acid. The mixtures varied in initial pH. The incubation time was varied. The concentrations of L-glutamic acid and the conversion rate (yield) in mole percent of the hydantoinpropionic acid in the several batches are listed in Table 1 together with the final pH of each solution.

The amount of L-glutamic acid formed was determined by bioassay.

Example 2

Cell suspension of the microorganism listed in Table 2 were prepared in the manner described in Example 1, and were employed for hydrolyzing D- and L-hydantoinpropionic acid to L-glutamic acid at 31° C. for 72 hours in a procedure analogous to Example 1.

Pseudomonas sp. No. 42, referred to in this table, is a new strain similar to, but not identical with *Ps. desmolytica* (see Bergey, l.c.). It has the following taxonomical characteristics:

Rods, 0.6–0.8 by 1.4 to 2.2 microns. Motile with polar flagella. Gram-negative. Spore not formed.

Nutrient agar colonies: Circular, smooth, flat to spreading, opalescent, margin translucent, pale yellowish gray, butyrous.

Nutrient agar slant: Growth moderate, spreading, flat, glistening, pale yellowish broth, medium unchanged.

Nutrient broth: Ring, strong turbid.

Nutrient gelatin Stab: No liquefaction.

B.C.P. milk: Alkaline.

Nitrite produced from nitrate.

Nitrate respiration: Negative.

Indole not produced.

Hydrogen sulfide slightly produced.

Starch not hydrolyzed.

V-P test: Negative.

No acid or gas from glycerol, xylose, glucose, sucrose, lactose and starch. According to Hugh and Leifson's method, no acid or gas is produced, aerobically or anaerobically, from glucose and lactose.

Utilized gluconate, succinate, m-hydroxy-benzoate, p-hydroxy-benzoate, protocatechuate, and gentisate as a sole source of carbon, but not utilized glucose, 2-ketogluconate, citrate, benzoate, salicylate and anthranilate.

Water-soluble pigment not produced.

Optimum pH for growth: Between pH 5.0 and pH 9.0. No growth at pH 4.0.

Optimum temperature for growth: 20° to 30°. Weak growth at 37°, no growth at 42°.

Catalase: Positive.

Aerobic.

Source: Soil.

TABLE 1

| Initial pH | Incubation time (hours) | From L-hydantoin propionic acid | | | From D-hydantoinpropionic acid | | |
|---|---|---|---|---|---|---|---|
| | | Final pH of the media | Concentration (g./dl.) | Yield (percent) | Final pH | Concentration (g./dl.) | Yield (percent) |
| 5.0 | 24 | 5.5 | Trace | | 5.2 | Trace | |
| 5.0 | 48 | 6.8 | 0.12 | 14.2 | 7.1 | 0.13 | 15.4 |
| 5.0 | 72 | 7.4 | 0.35 | 41.3 | 7.6 | 0.40 | 47.2 |
| 7.0 | 24 | 6.8 | 0.24 | 28.4 | 6.9 | 0.27 | 31.9 |
| 7.0 | 48 | 7.2 | 0.52 | 61.4 | 7.4 | 0.51 | 60.2 |
| 7.0 | 72 | 8.4 | 0.75 | 88.6 | 8.4 | 0.74 | 87.4 |
| 8.5 | 24 | 7.3 | 0.49 | 57.9 | 7.5 | 0.40 | 47.3 |
| 8.5 | 48 | 9.0 | 0.58 | 68.5 | 8.8 | 0.64 | 75.6 |
| 8.5 | 72 | 9.0 | 0.72 | 84.7 | 9.0 | 0.70 | 82.6 |

TABLE 2

| Microorganisms | Initial pH | From L-hydantoinpropionic acid | | | From D-hydantoinpropionic acid | | |
|---|---|---|---|---|---|---|---|
| | | Final pH | Concentration (g./dl.) | Yield (percent) | Final pH | Concentration (g./dl.) | Yield (percent) |
| Ps. dacunhae IAM-1199 | 7.0 | 8.2 | 0.45 | 52.9 | 8.0 | 0.45 | 52.9 |
| Ps. incognita IPR.AHM-38 | 7.0 | 7.8 | 0.05 | 5.9 | 8.0 | 0.04 | 4.7 |
| Ps. sp. No. 42 (ATCC 15447) | 8.5 | 8.6 | 0.31 | 36.5 | 8.5 | 0.30 | 35.3 |
| M. subflavus Fluege IFO 3062 | 7.0 | 7.5 | 0.21 | 14.1 | 7.5 | 0.13 | 15.3 |
| Aerobact. cloaceae T-14 | 7.0 | 8.0 | 0.03 | 3.5 | 7.8 | 0.02 | 2.4 |
| Aerobact. aerogenes T-13 | 7.0 | 7.4 | 0.04 | 4.7 | 7.5 | 0.04 | 4.7 |
| E. intermediate IPR S-51 | 7.0 | 7.2 | 0.06 | 7.1 | 7.3 | 0.07 | 8.2 |
| Ach. pestifer (ATCC 15445) | 7.0 | 7.4 | 0.07 | 8.2 | 7.4 | 0.07 | 8.2 |
| Ach. cycloclastes (ATCC 15446) | 7.0 | 7.5 | 0.08 | 9.4 | 7.4 | 0.07 | 8.2 |

Example 3

A culture medium was prepared from—

| | G./dl. |
|---|---|
| Glucose | 2 |
| Yeast extract | 0.5 |
| Mixed amino acids | 0.5 |
| KH$_2$PO$_4$ | 0.1 |
| MgSO$_4$·7H$_2$O | 0.04 |
| Sodium chloride | 0.3 |
| DL-hydantoinpropionic acid | 0.05 |

*Bacillus brevis* ATCC 8185 was cultured at 31° C. for 24 hours on a bouillon slant, and the culture was inoculated on 50 ml. batches of the culture medium and cultured at 31° C. for 15 hours at pH 7.0. Each resulting broth was mixed with 50 ml. of a solution of 10 g./dl. DL-hydantoinpropionic acid adjusted to pH 7.5, and the mixture was left to react at 37° C.

L-glutamic acid was found in the mixture as follows:

After 24 hours—3.2 g./dl. L-glutamic acid (75.3%)
After 48 hours—3.7 g./dl. L-glutamic acid (87.0%)
After 72 hours—3.9 g./dl. L-glutamic acid (91.8%)

One liter of the broth obtained after 72 hours of cultivation was sterilized, and the bacterial cells were removed by centrifuging. The clear supernatant liquid was concentrated under reduced pressure, and the pH of the concentrate was adjusted to 3.2 with hydrochloric acid.

The crystalline L-glutamic acid precipitated was recovered by filtration. When washed and dried, the crystals weighed 32 grams.

Many other conventional methods may obviously be employed for recovering the glutamic acid in solid, crystalline form from the culture medium.

While the invention has been described with reference to specific embodiments, it is not limited thereto, but is to be construed broadly within the scope of the appended claims.

What we claim is:

1. A method of producing L-glutamic acid which comprises contacting hydantoinpropionic acid in aqueous solution at pH 6–11 with an enzyme of microbial origin capable of hydrolyzing hydantoinpropionic acid until said hydantoinpropionic acid is converted to L-glutamic acid, and recovering said L-glutamic acid from said solution.

2. A method as set forth in claim 1, wherein said enzyme is prepared prior to said contacting by culturing a microorganism selected from a genus of the group consisting of Bacillus, Micrococcus, Pseudomonas, Aerobacter, Achromobacter, and Escherichia.

3. A method as set forth in claim 1, wherein said hydantoinpropionic acid is D-hydantoinpropionic acid.

4. A method as set forth in claim 1, wherein said enzyme is prepared prior to said contacting by culturing *Bacillus brevis* ATCC 8185.

5. A method as set forth in claim 1, wherein said enzyme is prepared prior to said contacting by culturing *Pseudomonas dacunhae* IAM-1199.

6. A method as set forth in claim 1, wherein said enzyme is prepared prior to said contacting by culturing Pseudomonas sp. No. 42. ATCC 15447.

7. A method as set forth in claim 1, wherein said enzyme is prepared prior to said contacting by culturing *Micrococcuc subflavus* Fluege, IFO 3062.

8. A method as set forth in claim 1, wherein said hydantoinpropionic acid is selected from the group consisting of L-hydantoinpropionic acid, D-hydantoinpropionic acid, and DL-hydantoinpropionic acid.

References Cited by the Examiner

Hassall, H., et al.: Journal of Biological Chemistry, vol. 238 (10), pages 3325–3329, October 1963.

Akamatsu, N.: Journal of Biochemistry (Tokyo), vol. 47, No. 6, pages 809–819 (1960).

A. LOUIS MONACELL, *Primary Examiner.*

L. M. SHAPIRO, *Assistant Examiner.*